United States Patent [19]

Pawelchak

[11] Patent Number: 6,037,415
[45] Date of Patent: *Mar. 14, 2000

[54] METHOD OF FINISHING PLASTIC SURFACES

[75] Inventor: Gordon Pawelchak, Coquitlam, Canada

[73] Assignee: Stuart Plastics Ltd., Burnaby, Canada

[*] Notice: This patent issued on a continued prosecution application filed under 37 CFR 1.53(d), and is subject to the twenty year patent term provisions of 35 U.S.C. 154(a)(2).

[21] Appl. No.: 08/945,689

[22] PCT Filed: May 2, 1996

[86] PCT No.: PCT/CA96/00277

§ 371 Date: Dec. 17, 1997

§ 102(e) Date: Dec. 17, 1997

[87] PCT Pub. No.: WO96/35743

PCT Pub. Date: Nov. 14, 1996

[30] Foreign Application Priority Data

May 2, 1995 [GB] United Kingdom .................... 9508873

[51] Int. Cl.$^7$ ....................................................... C08F 8/00
[52] U.S. Cl. .................... 525/194; 525/217; 525/232; 525/233; 525/234; 525/238; 525/241; 525/190; 525/197; 525/418; 525/326.1
[58] Field of Search ..................................... 525/185, 194, 525/232, 233, 234, 238, 241, 217, 190, 197, 418, 326.1

[56] References Cited

U.S. PATENT DOCUMENTS

| 4,197,355 | 4/1980 | Shepherd | 428/520 |
| 4,544,578 | 10/1985 | Duane | 427/140 |
| 4,802,769 | 2/1989 | Tanaka | 366/75 |

OTHER PUBLICATIONS

Blendex MPE Technical Data Sheet, GE Specialty Chemicals, General Electric Company, 1996.

*Primary Examiner*—David W. Wu
*Assistant Examiner*—Roberto Rabago
*Attorney, Agent, or Firm*—Marks & Clerk

[57] ABSTRACT

A composition for use in the finishing of a polymer surface comprises a dry, stable homogeneous mixture of pigment and a thermoplastic resin compatible with the polymer surface. The homogeneous mixture is soluble in a solvent to form a lacquer, for application to the surface, that has a colour determined by the amount and chromatic characteristics of the pigment in the dry mixture. The composition can be delivered to a customer and conveniently mixed on site to produce a lacquer having the desired colour characteristics.

10 Claims, No Drawings

METHOD OF FINISHING PLASTIC SURFACES

This invention relates to a method of finishing plastic surfaces, and more particularly polymer surfaces.

Large numbers of thermoplastic articles are discarded because they cannot be refinished. Whereas articles of metal or wood are traditionally painted, the painting of plastic surfaces has not proved an effective method of restoring a plastic surface to its original quality. Typically plastic articles are coloured with a pigment, that is with a colorant that is put into the liquid plastic mix. This is to avoid the problems obtaining an effective bond to the surface.

The finishing of telephones presents a particular problem. A telephone handset may be discarded when it is in perfectly good working condition simply because its appearance has deteriorated to the point where it is no longer acceptable to the public. A number of proposals have been made for finishing plastic surfaces, particularly telephones, but all have some disadvantages. Representative of this prior art are U.S. Pat. Nos. 4,133,912 and 4,247,580.

U.S. Pat. No. 4,197,355, for example, discloses a lacqueur for refurbishing telephones comprising, for example, acrylonitrile butadiene styrene (ABS) resin, dissolved in a solvent component, which is a mixture of ketone and a second solvent selected from a group including, for example, ethylene glycol monoethyl ether acetate.

While the lacqueur described in the above patent can result in satisfactory coatings, complicated equipment, such as ball mills and the like, must be employed on site to prepare the lacquer. This means that a special solution must be prepared for each colour desired by the customer. Once dissolved in the solvent, the mixture is not stable over long-term storage so it cannot be delivered in this form.

British patent no. 1,572,996 describes a method of making a paint wherein a dry composition is dissolved in a solvent. However, this patent does not allow the user to conveniently prepare a coating composition of the right colour on site.

An object of the invention is to alleviate this problem.

Accordingly, the present invention provides a product for use in the finishing of a polymer surface, comprising at least two parts, each part consisting of pellets comprising a dry (i.e. free of solvent), stable homogeneous mixture of pigment and a thermoplastic resin compatible with the polymer surface, the homogeneous mixture being soluble in a solvent to form a lacquer that has a colour determined by the amount and chromatic characteristics of the pigment, and the pigments of each part having different colours selected so that a lacqueur of a desired colour can be obtained by dissolving predetermined proportions of said parts in said solvent.

Since the premixed composition made in accordance with the invention is dry and stable in long term storage, it can be stored and delivered to the customer as required, who merely has to mix the composition with a commercially available solvent. Different compositions with predetermined base colours can be provided so that the customer can obtain any desired colour simply by mixing different dry compositions in predetermined ratios in accordance with the instructions and then dissolving the resulting dry mix in a solvent. Alternatively the dry compositions can be added directly to the solvent so long as the ratios for the colour desired are maintained.

The invention also provides a method of finishing a polymer surface, comprising first making the product defined above, transporting the product to an application site, subsequently dissolving the product in a solvent at the application site to form a lacquer, and applying the lacqueur to the polymer surface and allowing it to dry.

The present invention thus provides a method of finishing a polymer surface that has achieved excellent results, in particular for which the colour and quality of the surface are consistent, and which avoids the need for the customer to have complicated mixing equipment, such as ball mills and the like.

The colorant may be present in the range of 3 to 6% by weight of a dry mixture of ABS and colorant. The actual amount of the colorant will depend on the depth of colour required and the chromatic characteristics of the pigment, but can easily be determined by routine experiment by the skilled worker.

The ABS may be used in admixture with a compatible polymer, such as polystyrene or a copolymer of styrene and acrylonitrile in the ratio of 20:80 to 80:20.

Once mixed with solvent, the resulting solution is preferably applied by spraying, although it can be applied in any conventional manner.

The solvent may be mixture of a ketone and an ether acetate. The constituents of the solvent may be present in the range of ketone acetate of 80:20 to 60:40.

Useful ketones include methyl isobutyl ketone and methyl ethyl ketone and a useful ether acetate is propylene glycol monomethyl ether acetate.

The sprayed surface may be dried in air. The air may be forced air at ambient temperature, or the air may warmed to a temperature in the range 35 to 65° C. to decrease the drying time. The surface may also be dried using infrared radiation.

The method of the present invention is applicable to the finishing of polymer surfaces that are thermoplastic or non-thermoplastic.

The following method illustrates the invention and is described by way of example only.

A solid mixture comprising ABS, for example a mixture of those polymers available under the trademark GE Blendex 703 and GE Blendex 1000 in equal proportions, and at least one colorant, the amount and colour of which depends on the colour desired in the final product, is blended in an extruder.

The blended material is pelletized. The resulting pellets can be stored indefinitely. In use, the pellets are dissolved in a solvent mixture comprising a ketone and ether acetate. Examples of the ketone and the ether acetate mixtures include methyl ethyl ketone with propylene glycol monomethyl ether acetate; methyl isobutyl ketone with propylene glycol monomethyl ether acetate. The ketone ether acetate ratio is in the range 80:20 to 60:40.

Specific colour formulations can be easily produced either by blending colorants before pelletization or by dissolving various coloured pellets in the same solvent.

The resulting solution is sprayed onto a plastic substrate and allowed to air dry. Although not necessary, drying times can be reduced by exposing the coated surface to forced air at ambient temperature or an elevated temperatures of 38° to 68° C.

The resulting surface is of excellent strength and adhesion and can easily be reproduced.

EXAMPLE

The following pellets were prepared in a plastics compounding extruder:

White
37.5% GE Plastics BMPA-1000 resin
37.5% GE Plastics 703 resin
28.6% NL Chemical Inc. #2071 White pigment Black
48% GE Plastics BMPA-1000 resin
48% GE Plastics 703 resin
3.8% Columbian Chemical Inc. #1020 Raven Black pigment
Red
40% GE Plastics BMPA-1000 resin
40% GE Plastics 703 resin
20% Harcos Pigments Inc. #2199D Red Iron Oxide pigment
Yellow
40% GE Plastics BMPA-1000 resin
40% GE Plastics 703 resin
20% Cookson Pigments Inc. Chrome Yellow #HT-13 or Krolor #KY907

To prepare 5 gal (Imp) of coating, 4092.88 grams of white pellets, 4.67 grams of black pellets, 1.305 grams of red pellets and 23.22 grams of yellow pellets were dissolved in sufficient solvent to produce the required volume (5 imperial gallons) of coating. This operation can be conveniently carried out at the customer's premises.

It will be appreciated that a very important advantage of the invention is the ability to offer the customer a stable product that can be mixed on site with minimal equipment to produce a desired colour in accordance with a colour chart that can be provided with the product.

I claim:

1. A method of preparing a lacquer for finishing a polymer surface, comprising the steps of:

making an intermediate product comprising at least two separate components, each said component comprising a pelletized dry, stable, homogeneous, blended solid mixture of pigment having a predetermined color and a thermoplastic resin compatible with the polymer surface, each said component being soluble in a solvent to form a lacquer that has a color determined by the amount and chromatic characteristics of the pigment, and said predetermined color for each component being different and selected so that a lacquer of any desired color can be obtained by dissolving said components in said solvent in predetermined proportions that depend on said desired color;

transporting said intermediate product to an application site; and at said application site adding said predetermined proportions of said components to said solvent to form said lacquer for application to a polymer surface.

2. A method as claimed in claim 1, characterized in that the pigment is present in the range 3 to 6 percent of the dry mixture.

3. A method as claimed in claim 2, characterized in that said thermoplastic resin is ABS resin.

4. A method as claimed in claim 3, characterized in that the ABS is used in admixture with a compatible polymer, the ABS compatible polymer ratio being in the range 20:80 to 80:20.

5. A method as claimed in claim 4, characterized in that the compatible polymer is polystyrene.

6. A method as claimed in claim 4, characterized in that the compatible polymer is a copolymer of styrene acrylonitrile.

7. A method as claimed in claim 1, wherein said solvent is a mixture of a ketone and an ether acetate.

8. A method as claimed in claim 7, in which the constituents of the solvent are present in the range of ketone: acetate of 80:20 to 60:40.

9. A method as claimed in claim 8, in which the ketone is selected from methyl isobutyl ketone and methyl ethyl ketone.

10. A method as claimed in claim 8, in which the ether acetate is propylene glycol monomethyl ether acetate.

* * * * *